INVENTOR.
WENDELL C. MORRISON
BY [signature]
ATTORNEY

Jan. 31, 1956 W. C. MORRISON 2,733,433

TEST EQUIPMENT FOR TELEVISION

Filed Oct. 16, 1952 3 Sheets-Sheet 2

INVENTOR.
WENDELL C. MORRISON

BY [signature]

ATTORNEY

Jan. 31, 1956 W. C. MORRISON 2,733,433

TEST EQUIPMENT FOR TELEVISION

Filed Oct. 16, 1952 3 Sheets-Sheet 3

INVENTOR.

WENDELL C. MORRISON

BY [signature]

ATTORNEY

United States Patent Office 2,733,433 Patented Jan. 31, 1956

2,733,433

TEST EQUIPMENT FOR TELEVISION

Wendell C. Morrison, Princeton, N. J., assignor to Radio Corporation of America, a corporation of Delaware Application October 16, 1952, Serial No. 315,021

4 Claims. (Cl. 340—351)

The present invention relates to a test signal generator adapted to be used with video frequency circuits and terminal equipment.

More particularly, the present invention relates to test equipment adapted to produce a test signal consisting of a plurality of discrete bursts of frequency together with certain signal components, such as blanking and sync pulses, which are normally required for the proper operation of certain video frequency circuits.

Heretofore, testing of the video frequency response of television equipment, for example, has been performed generally by one of two methods. The method most commonly employed has been that of applying the output of a video sweep generator to the input of the equipment being checked so that the output of the latter might be observed with an oscilloscope. While this method is rapid, it has also been found to be somewhat limited in usefulness. An important factor limiting its usefulness is that fact that it can not be employed with equipment which requires the presence of synchronizing pulses. Another method proposed in the prior art has been that of feeding the output of an oscillator to the equipment under test and measuring, point by point, the input and output levels for different known frequencies. Despite the accuracy with which this latter method may be conducted, it has not been widely used, in view of its time-consuming requirements. The latter method is also subject to the criticism that it is not susceptible of employment with equipment requiring sync pulses, unless such equipment be first modified.

It is, therefore, a primary object of the present invention to provide means for testing the frequency response of video frequency circuits and terminal equipment, which means affords the necessary horizontal sync pulse components of the test signal which may be necessary for the proper operation of the equipment under test. Such equipment, for example, would include stabilizing amplifiers, television transmitters and certain types of video amplifiers which establish bias on the basis of sync peaks.

It is a further object of the present invention to provide means for generating a test signal capable of use in checking an overall television system.

In general, the present invention contemplates a signal generator comprising means for producing blanking pulses upon which are superimposed sync pulses and means for generating various discrete bursts of video frequencies. The blanking and sync pulses are added to the plurality of frequency bursts to form the composite test signal which may then be applied to the input of the equipment under test. By observing the output of such equipment on an oscilloscope, the frequency response of the equipment may then be determined visually by the effect produced by it on the different frequency bursts.

A further object of the present invention is to provide a test signal generator as described above wherein means are present for controlling the duration of each of the plural frequency bursts.

In order for proper testing to be accomplished, it is necessary that the amplitude of each burst be controlled so that, if desired, all of the different frequencies represented by the test signal may be equal in amplitude. It is, therefore, still another aim of the present invention to provide means for controlling the amplitude of each video frequency sine wave constituting a part of the test signal.

Since the frequency pass band of a given equipment such as a television transmitter may be in the nature of 6 megacycles, a comprehensive check of the frequency response of such equipment requires that substantially the entire frequency spectrum contained within such band width be included in the test. Hence, another object of the invention is that of providing means for varying and controlling the frequency of each of the oscillators which produce the different frequency bursts.

Additional objects and advantages of the present invention will be recognized by persons skilled in the art from a study of the following description of the attached drawings in which.

Figure 1:
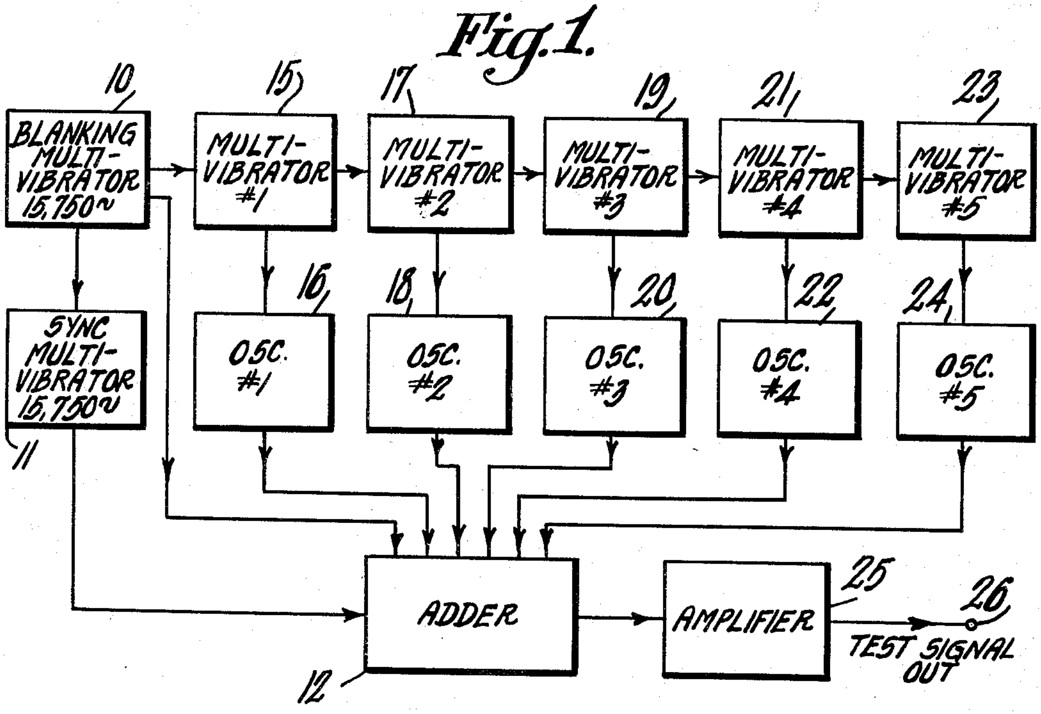
Fig. 1 is a block diagram illustrating a test signal generator embodying the present invention.

Referring to the drawings and, particularly, to Fig. 1 thereof, reference numeral 10 indicates a blanking multivibrator which may be of the free-running type and which may have a basic frequency of 15,750 cycles per second, which is, of course, the scanning frequency under present day standards. This multivibrator produces pulses of a predetermined duration which are employed in triggering a multivibrator 11 which, in turn, produces pulses of shorter duration which, when added to the pulses of multivibrator 10 in the adding circuit 12, constitute the combined blanking pedestal and sync pulse 13 and 14, respectively, shown in Fig. 2.

The output of multivibrator 10 is further applied to multivibrator $MV_1$ (designated by reference numeral 15) which serves to key its associated oscillator 16 which may have a basic frequency of, for example, 0.5 to 1.5 megacycles. The trailing edge of the pulse produced by multivibrator 15 triggers multivibrator 17 which, in a similar manner, controls its associated oscillator 18. The basic frequency of oscillator 18 may, for example, be within the range of 1.0 to 2.1 megacycles. The trailing edge of the output pulse of multivibrator 17 triggers multivibrator 19 and the latter keys oscillator 20. In a similar manner multivibrator 21 controls its associated oscillator 22 and multivibrator 23 determines the keying of oscillator 24. It will be appreciated from the foregoing that as many oscillators for producing as many different frequencies as are desired may be added to the circuit as described, in which event each of such additional oscillators may be keyed by a multivibrator similar to those designated 15, 17, 19, 21 and 23. The sine wave output of each of the oscillators is added to the blanking pedestal and sync pulses to produce the signal illustrated by Fig. 2. The signal thus produced is applied to an amplifier 25 and the latter circuit furnishes, at its output point 26, the test signal of Fig. 2.

As stated above, the test signal may then be applied to the input of a video freqency circuit and examined on an oscilloscope. The oscilloscope may then be connected to the output of the equipment being tested and the effect thereof on the test signal may be visually determined by noting the attenuation of one or more of the sine waves which comprise the test signal.

Figure 3:
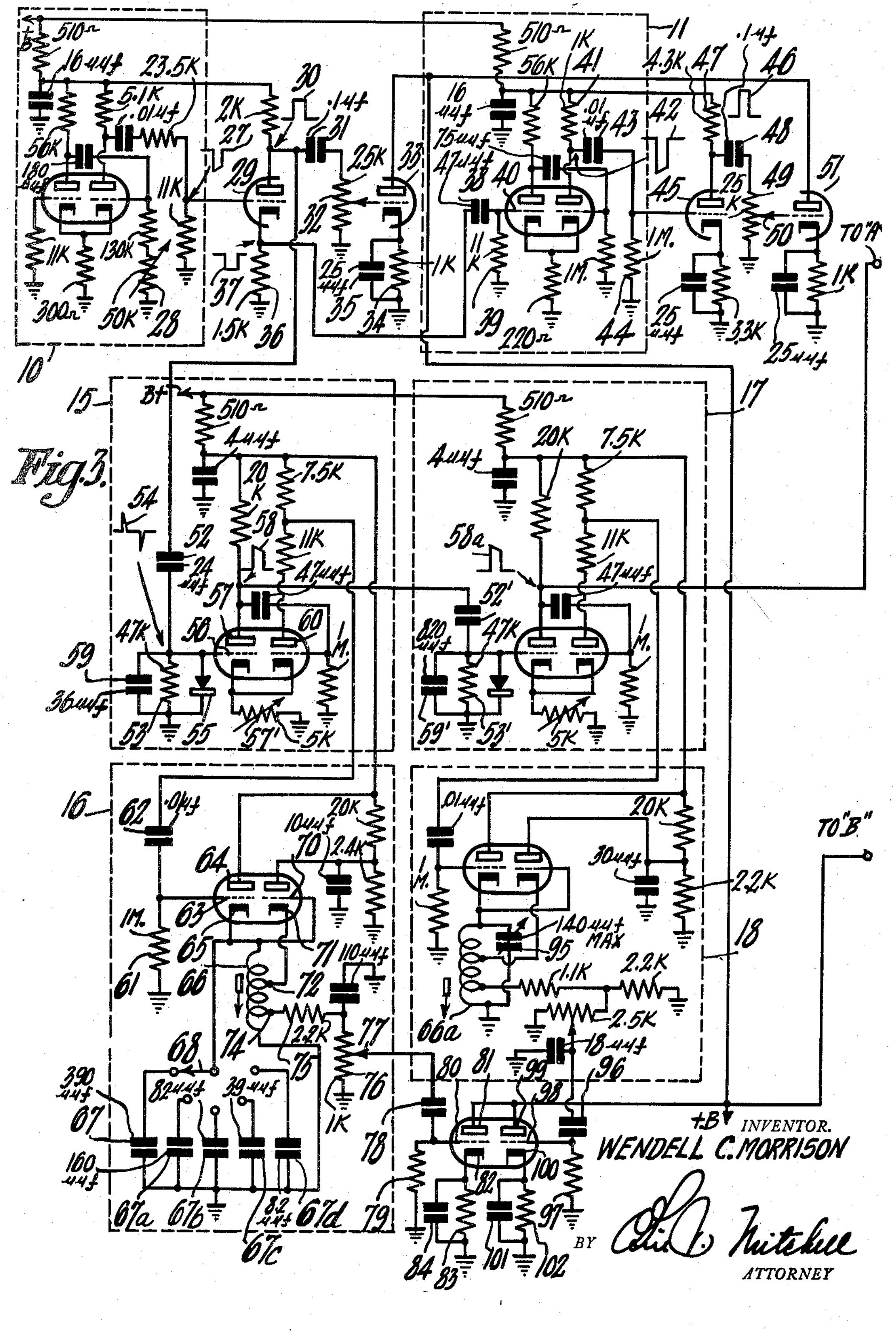
Figs. 3 and 4 constitute a schematic circuit diagram of the apparatus shown by way of block diagram in Fig. 1.
Figure 4:
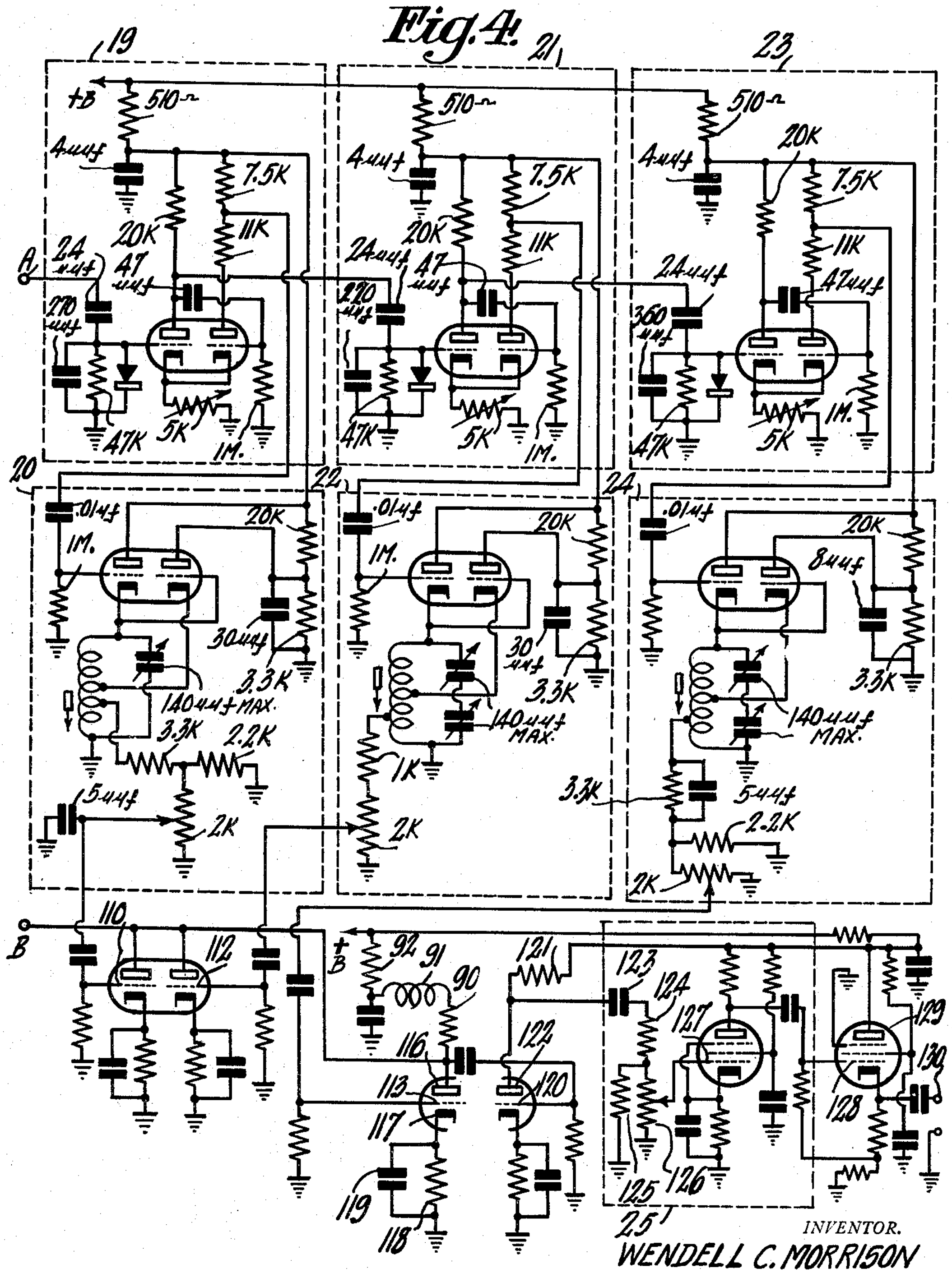

Figs. 3 and 4 illustrate schematically a complete and operative circuit corresponding to the circuitry denoted generally by Fig. 1 and, in order to show the relationship of the various portions of Figs. 3 and 4 with the block diagram, corresponding reference numerals have been used where applicable. In Fig. 3 the circuit included within the dotted line rectangle 10 comprises a well-known multivibrator of the astable variety. This multivibrator produces, at the rate of 15,750 cycles per second, a series of negative pulses 27 which, as illustrated, are not quite rectangular, there being a non-linear "pedestal" portion. A multivibrator such as that in question is described in the MIT Radiation Laboratory Series publication "Wave Forms," first edition, published by McGraw-Hill Book Co., Inc. in 1949 at page 171 et seq. Briefly, it may be noted that multivibrator 10 requires no input pulses or triggers and its output pulses 27 depend for their duration and height upon the values of the various R-C circuits comprising the multivibrator. The resistor 28 is, as illustrated, variable in order that the frequency of the multivibrator may be controlled.

The pulse output 27 of multivibrator 10 is applied to the grid of an inverter-clipper tube 29 which, as persons skilled in the art will appreciate, has as its function that of reversing the polarity of the blanking pulse 27 and "clipping" off the top of the pulse so that it is flat. The voltage waveform thus produced at the plate of tube 29 is indicated by reference numeral 30. This positive-going pulse is coupled through capacitor 31 and resistor 32 to the grid of an adder tube 33, the function of which will appear hereinafter. Tube 33 is provided with cathode-biasing through resistor 34 and capacitor 35. In order that the amplitude of the input waveform to the adder tube 33 may be controlled, capacitor 32 is coupled to the grid of tube 33 by means of a variable tap, as shown. At the cathode of tube 29 there appears across resistor 36 a voltage pulse such as that shown at 37 and this negative pulse is coupled by means of capacitor 38 and resistor 39 to the grid 40 of the sync multivibrator 11 which may be an astable multivibrator such as is described in detail in the "Wave Forms" publication cited above on page 166 et seq. Multivibrator 11, which is a "cathode coupled" type, produces across the plate resistor 41 a voltage wave form such as is indicated by reference numeral 42.

Figure 2:
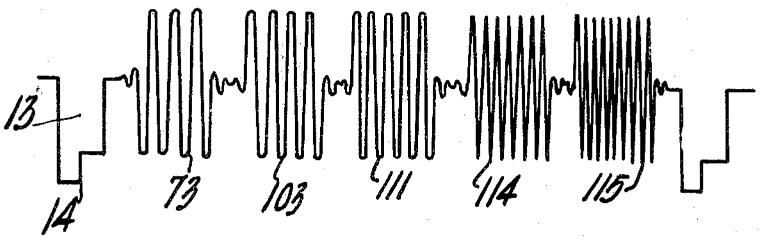
Fig. 2 is a graphical showing of a test signal which may be produced by the apparatus of the present invention.

Since multivibrator 11 is triggered by the leading edge of wave form 37, it will be appreciated that its output wave form 42 will have its leading edge coincident with that of pulse 37. Pulse 42, however, corresponds to a simulated "sync pulse" and, therefore, the values of the time constant circuits of multivibrator 11 have been chosen so that pulse 42 is of substantially shorter duration than the blanking pulse 37 which, of course, is the usual case in television synchronizing methods. When pulse 42 is added to blanking pulse 37, as will be explained more fully hereinafter, the resultant wave form will have no "front porch" although there will be a "back porch," as seen in Fig. 2.

Pulse 42 is coupled through capacitor 43 and resistor 44 to the grid of an inverter-clipper tube 45 which functions in the same manner as that described with respect to tube 29. The positive-going sync pulse 46 is taken from the anode of tube 45 across its load resistor 47 and coupled by capacitor 48 and resistor 49 through adjustable tap 50 ("sync gain") to the grid of the sync adder tube 51.

Actually, as shown in Fig. 3, tubes 29 and 33 may constitute the two halves of a duo-triode such, for example, as a 12AU7 and tubes 45 and 51 similarly constitute the two halves of another 12AU7.

The invention as described thus far has produced, among other wave forms, pulse 30 which is taken from the anode of tube 29 and applied to a differentiating circuit comprising capacitor 52 and resistor 53 which, as is known in the art, would normally produce a differentiated wave form such as is indicated at 54. The differentiated wave form, however, is applied to a crystal diode 55 which is so disposed that it conducts during the positive peak of wave form 54, thus, in effect, affording a "short circuit" to ground. The negative peak of wave form 54, however, which corresponds to the trailing edge of pulse 30 is applied to the grid 56 of multivibrator 15. This multivibrator may also be, as illustrated, a conventional cathode coupled multivibrator such as was described above with respect to multivibrator 11 and its output at the anode 57 is a pulse having the shape indicated at 58. Shunted across resistor 53 in the grid circuit 56 of multivibrator 15 is a capacitor 59 which may be, as illustrated, 36 micro-micro farads in value. The purpose of this capacitor is that of delaying the trigger which is applied to "space" the multivibrator pulse slightly in time from the trailing edge of the blanking pulse.

The variable cathode resistor 57′ constitutes a width control for the pulse output of multivibrator 15, thus, in effect, controlling the length of the burst of oscillator 16, the operation of which will be described infra.

A pulse of the shape such as that indicated at 58 but of negative polarity is taken from the anode 60 across the load resistor and applied through R-C coupling 61, 62 to the grid 63 of a triode constituting one half of a 12AT7. By virtue of the normal bias of grid 63, current normally flows from anode 64 to cathode 65 of the triode, thus affording a low impedance across the tuned grid circuit of oscillator 16. Oscillator 16 comprises the other half of the 12AT7 and includes a tunable inductance 66 in parallel with one of the capacitors, 67, **67*a*, 67*b*, 67*c* and 67*d*. As shown in Fig. 3, selector switch 68 is so disposed that capacitor 67 is in circuit with the tunable inductance 66. The oscillator 16 depicted in the drawings may be a "pulsed Hartley oscillator" such as is described on page 143 of the above cited "Wave Forms." Since current normally flows in that portion of the duotriode comprising elements 63, 64 and 65, the "loading" thus afforded across tuned circuit 66, 67 effectively prevents oscillator 16 from producing oscillations. Upon the application to grid 63 of the negative-going pulse above-described, current will cease flowing in the damper tube 63—65, thus removing the "load" from across the tuned oscillator circuit 66, 67 and permitting oscillator 16 to produce a sine wave oscillation of a frequency determined by parameters 66 and 67 which may be of the order of 0.5 to 1.5 megacycles, depending upon which of the capacitors is in circuit with the inductance 66. For purposes of completeness of description, it may be noted that grid 70 is connected to one end of inductance 66, while cathode 71 is connected to a remote tap 72** of the inductance.

The sine wave output of oscillator 16 of the form indicated at 73 in Fig. 2 is taken off the inductance 66 from a tap 74 through resistor 75, the purpose of the resistor being that of preventing the amplitude control (described below) from producing any reaction on the circuit 66, 67.

In order to afford an amplitude control of oscillations 73, the output of oscillator 16 is taken across resistor 76 by means of a variable tap 77. This is coupled through capacitor 78 and resistor 79 to the grid 80 of an adder tube constituting, for example, one half of a duo-triode 12AU7. By means of this adder tube which includes anode 81 and cathode 82 self-biased by means of resistor 83 and shunt capacitor 84, sine wave oscillations 73 are added to the blanking pulse 13 and sync pulse 14 to produce the first portion of the wave form of Fig. 2.

More particularly, as stated above, pulse 30 is coupled to the grid of adder tube 33 and, after being inverted therein, is applied to point "B" which is at one end of the common load impedance including resistor 90 and inductance 91. In a similar manner, pulse 46 is applied to the grid of the sync adder tube 51 which inverts it and applies it across the same load impedance. Since, as has been described, the pulses 30 and 46 have a common time of origin, they appear in the superimposed form shown in Fig. 2 as 13 and 14, respectively, when applied to the common load impedance at point "B."

Similarly, by virtue of the delaying action of differentiating circuit 52, 53 and the delay afforded by capacitor 59, the gating of oscillator 16 results in its frequency bursts occurring slightly after the trailing edge of pulse 30 and its output burst is applied to adder tube grid 80 so that it too appears at point "B" of the common load.

As described to this point, the invention has produced that portion of the composite test signal wave form of Fig. 2 which includes the blanking pulse 13, sync pulse 14 and sine wave burst 73.

It has already been stated and persons skilled in the art will appreciate the fact that multivibrator 15 produces in the circuit of anode 57 a wave form 58. This wave form actually has its leading edge spaced somewhat after the trailing edge of wave form 30 (by virtue of the differentiating circuit 52 and 53 and the delaying action of capacitor 59) and is applied to multivibrator 17 through a differentiating circuit comprising capacitor 52′ and resistor 53′, the latter being shunted by a delaying capacitor 59′. Multivibrator 17 is in all respects the same as multivibrator 15 and the only difference between its operation and that of multivibrator 15 is the time of its trigger which is produced from wave form 58. Thus, it will be understood that multivibrator 17 will control the damper tube of oscillator 18 in exactly the same manner as multivibrator 15 controls oscillator 16.

Oscillator 18 is substantially the same as oscillator 16, the only difference between them being the fact that oscillator 18 is provided with a variable capacitor 95 which, as illustrated, may be one which has a maximum capacitance of 140 micro-micro farads. Capacitor 95 and tunable inductance **66*a* control the frequency of oscillation of oscillator 18 and the output which may be in the range of 1.4 to 3 megacycles. These oscillations are coupled through capacitor 96 and resistor 97 to the grid 98 of the triode adder tube which also includes anode 99 and cathode 100, self-bias being provided by cathode resistor 102 shunted by capacitor 101. The output of this adder tube is applied to point B of the common load impedance and appears as at 103** in the wave form of Fig. 2.

From the foregoing, it will be readily understood that multivibrator 19, the circuitry of which is illustrated within the dotted rectangle bearing that reference numeral is substantially the same as multivibrators 17 and 15. Multivibrator 19, moreover, is triggered by a pulse **58*a* from multivibrator 17, the triggering of multivibrator 19 occurring in time slightly after multivibrator 17 has completed its pulse. As in the case of multivibrators 15 and 17 and their associated oscillators 16 and 18, respectively, multivibrator 19 determines the operation of oscillator 20, which is substantially the same as oscillator 18. The burst output of oscillator 20, which may be of a frequency of 1.4 to 3 megacycles, is applied to grid 110 of an adder triode and the output of the latter appears across the common load impedance so that the burst output of oscillator 20 is "added" to the preceding bursts, as shown by reference numeral 111** on Fig. 2.

Multivibrators 21 and 23 are the same as the preceding multivibrators 15, 17 and 19 and they, in turn, control the operation of oscillators 22 and 24, respectively. Oscillators 22 and 24 are substantially identical to oscillators 18 and 20, with the exception that the tuning condensers of the former two are smaller in value, in view of their higher frequencies of oscillation. More particularly, oscillator 22 may have a frequency range of 2.2 to 3.8 megacycles, while oscillator 24 may have a frequency of 3 to 5.4 megacycles. The outputs of oscillators 22 and 24 are applied respectively to grids 112 and 113 of their associated "adder" tubes, so that their frequency bursts are added to the preceding bursts, as shown at 114 and 115, respectively, in Fig. 2.

The combined outputs of the blanking multivibrator 10, sync multivibrator 11, and oscillators 16, 18, 20, 22 and 24 are thus added across the common load impedance 90, 91 located in the circuit of anode 116 of the final adder tube. Cathode 117 of this tube is provided with biasing resistor 118 and capacitor 119 and, since the output of the tube appearing across the common load is negative-going, it is applied to the grid 120 of an inverter which constitutes half of a 12AU7 duo-triode. The function of the inverter is, as will be appreciated, that of producing across its load resistor 121 in series with anode 122 a reversal of polarity of the composite waveform.

This positive-going waveform is coupled by means of capacitor 123 and resistors 124, 125 and 126 to the grid 127 of an amplifier tube, the amplifier circuit being conventional and indicated by reference numeral 25. As illustrated in the drawing, grid 127 is connected to coupling resistor 126 by means of a variable tap, thus providing means for adjusting the overall gain of the generator.

The output of the amplifier is then applied to the grid 128 of a conventional cathode follower tube 129 and the signal of waveform 2 appears at terminal post 26.

In operation, it will be apparent from the foregoing that multivibrator 10 constantly produces, at the rate of 15,750 C. P. S. pulses 30, while multivibrator 11, which is triggered by the former multivibrator, forms pulses 42. Pulses 30 trigger multivibrator 15 which gates its associated oscillator 16 for producing the discrete frequency burst 73. Multivibrator 15 triggers multivibrator 17, which, in turn, gates its oscillator 18 and also triggers multivibrator 19 for keying oscillator 20. In a similar manner, multivibrator 19 triggers mulvibrator 21 for gating oscillator 22 and multivibrator 21 triggers multivibrator 23 to control oscillator 24. The pulses 30 and 46 are added by means of adders 33 and 51, respectively, so that they appear across the common load impedance 90, 91 as blanking pulse 13 and sync pulse 14 and the frequency bursts of oscillators 16, 18, 20, 22 and 24 are added by means of their respective adder tubes (which may be identified by their control grid reference numerals 80, 98, 110, 112 and 113, respectively). Thus the bursts will be combined across the common load impedance with the blanking pulses 13 and sync pulses 14 to form the composite test signal which is amplified at 25 and appears at the output terminal 26 as the wave form of Fig. 2.

To reiterate, capacitors 59, 59′ and the corresponding capacitors of multivibrators, 19, 21 and 23 serve to delay the triggering of their associated multivibrators to produce the spacing between the various portions of the composite signal of Fig. 2. A primary advantage of such spacing between the bursts and blanking pulses is the fact that, since the conclusion of each burst may not be completely instantaneous, the spacing renders the bursts distinctly separate in the output waveform.

By way of additional resumé, it will be seen that each of the oscillators may be controlled as to the amplitude of its output burst by means of the adjustable tap such as that indicated at 77 for oscillator 16, each of the other oscillators being similarly provided with such a gain control.

The output test signal of the circuit thus described may be applied to a video frequency equipment to be tested and the output of such equipment under test may be observed on an oscilloscope capable of handling the video frequencies. Hence, it is seen that the frequency response of the equipment is visually apparent by the appearance of the output signal on the oscilloscope as compared with the input test signal of Fig. 2.

From the foregoing, it is apparent that, by suitably controlling the "widths" of the gating multivibrators, the sum of the periods of oscillation may be made greater than the time between sync pulses. Thus, for example, a burst may, if desired, be made to occur during a blanking pedestal to simulate a "color sync burst" such as has been proposed for color television use.

It will be appreciated by persons skilled in the art that fewer or more oscillators may be employed in the test signal generator of the present invention, depending upon the extent to which the testing is desired to be conducted. Further modifications such as the substitution of other forms of multivibrators and oscillators for those disclosed herein are also contemplated and are within the scope of the invention as defined by the appended claims.

Having thus described my invention, what I claim as new and desire to secure by Letters Patent is:

1. A signal generator which comprises: an oscillator means for producing a sinusoidal voltage wave of a predetermined frequency; means for producing a voltage pulse of predetermined duration and of generally square shape; damper means connected across said oscillator means, said damper comprising an electronic tube adapted to be rendered non-conductive by a pulse from said pulse-producing means, whereby said oscillator means is permitted to produce said oscillations of a predetermined frequency; a second oscillator means for producing a sinusoidal voltage wave of a frequency different from that of said first oscillator means; a damping means connected across said second oscillator means; a second voltage pulse generator adapted to render said last-named damping means in operative; and means coupling said first pulse producing means to said second pulse generator whereby said second pulse generator is responsive to the trailing edge of the pulse output of said first pulse-producing means.

2. A signal generator for television signal processing apparatus, which generator comprises: a source of pulses of generally rectangular waveshape; a plurality of oscillators, each capable of producing a wave of a certain frequency different from that of another; a plurality of keying pulse generators, each operatively connected to one of said oscillators for applying a pulse to its associated oscillator to cause said oscillator to produce a discrete burst of oscillations; means for applying pulses from said source to one of said keying pulse generators so as to cause said generator to produce a pulse; means for applying pulses from said one keying pulse generator to another one of said generators for causing the second generator to produce a pulse following the pulse from said first generator; and means associated with said oscillators and said source of pulses for adding such bursts of oscillations of different frequency and pulses from said source to produce a composite waveform.

3. A signal generator for television signal processing apparatus, which generator comprises: a source of pulses of generally rectangular waveshape; a plurality of oscillators, each capable of producing a wave of a certain frequency different from that of another; a plurality of keying pulse generators, each operatively connected to one of said oscillators for applying a pulse to its associated oscillator to cause said oscillator to produce a discrete burst of oscillations; means for applying pulses from said source to one of said keying pulse generators so as to cause said generator to produce a pulse; means for applying pulses from said one keying pulse generator to another one of said generators for causing the second generator to produce a pulse following the pulse from said first generator, a further pulse generator for producing pulses of shorter duration than pulses from said source, said further pulse generator being responsive to pulses from said source to produce pulses occurring generally in synchronism with pulses from said source; and means associated with said oscillators and said source of pulses for adding such bursts of oscillations of different frequency and pulses from said source and from said further pulse generator to produce a composite waveform.

4. A test signal generator which comprises: a first oscillator for producing a wave of a first frequency; a second oscillator for producing a wave of a second frequency different from said first frequency; first and second gating-pulse generators, respectively associated with said oscillators for causing said oscillators to produce respectively bursts of energy of their respective frequencies; a source of synchronizing pulses occurring at television line rate; means for applying pulses from said source to said first pulse generator for causing said generator to apply a gating pulse to said first oscillator; means operatively coupled between said first and second pulse generators for causing said second pulse generator to apply a gating pulse to said second oscillator timed to occur after such first gating pulse; and adder means operatively associated with said source of pulses and said oscillators for adding said synchronizing pulses and said bursts from said oscillators to form a composite waveform in which said synchronizing pulses and bursts occur in sequence during a television line interval.

References Cited in the file of this patent

UNITED STATES PATENTS

| | | |
|---|---|---|
| 2,409,229 | Smith, Jr., et al. | Oct. 14, 1946 |
| 2,581,056 | Walmsley et al. | Jan. 1, 1952 |
| 2,674,734 | McCreary | Apr. 6, 1954 |

OTHER REFERENCES

Signal Sources for Television Testing, Journal of the British Institute of Radio Engineers, December 1950, p. 369–392.